Patented July 15, 1941

2,249,525

UNITED STATES PATENT OFFICE 2,249,525

PURIFICATION OF VITAMIN A ESTERS

Kenneth C. D. Hickman, Rochester, N. Y., assignor to Distillation Products, Inc., Rochester, N. Y., a corporation of Delaware No Drawing. Application February 11, 1939, Serial No. 255,928

9 Claims. (Cl. 260—410)

This invention relates to improved procedure for the preparation of purified Vitamin A ester concentrates. More particularly, it pertains to improved methods for removing Vitamin A ester concentrates from substances which impart undesirable odor and taste or which have no vitamin potency.

Vitamin A is now known to occur in natural fish oils in the ester form. These esters can be concentrated by molecular distillation. When putrid oils are distilled, and in some cases when ordinary oils are distilled, certain fractions are obtained which are odoriferous and/or contain undesirable constituents such as sterols, free fatty acids, coloring matter and other substances which are undesirable but which are difficult to separate. When Vitamin A esters are prepared by synthetic means, such as esterification of Vitamin A alcohol, the ester product contains impurities and unreacted Vitamin A alcohol. It is desirable to separate the impurities and particularly the unreacted alcohol since it rapidly loses its vitamin potency. Until the advent of my invention no method was known for separating Vitamin A ester from Vitamin A alcohol.

This invention has for its object to overcome the above difficulties. Another object is to provide a process for separating impurities and other undesired constituents from Vitamin A ester concentrates prepared by distillation, esterification or otherwise. Another object is to provide a simple procedure for separating Vitamin A alcohol from Vitamin A esters. Other objects will appear from the following description and claims.

These and other objects are accomplished in accordance with my invention which includes extracting the impurities from the Vitamin A ester with an alcohol.

I prefer to employ ethyl alcohol for this purpose, but lower aliphatic alcohols are in general useful. Methyl and ethyl alcohol are superior for this purpose.

The Vitamin A ester concentrate and the alcohol may be contacted in any desired manner. It is apparent that intimate contact between the two materials must take place. The simplest procedure would be to mix the two materials in a simple shaking equipment. Usual extraction apparatus may be used but I prefer to employ counter-current equipment. Repeated extractions with fresh alcohol serves to yield a purer product and is desirable in many cases, particularly if the concentrate is quite impure.

In some cases Vitamin A ester may dissolve to a more or less degree in the alcohol solvent. This is not particularly disadvantageous since the alcohol, after separation from the main body of the concentrate, can be treated to recover the Vitamin A ester. This can be easily accomplished by distilling off the alcohol in a vacuum.

The alcohol dissolves much of the impurities from the vitamin concentrate and these impurities in many cases have decided value. For instance cholesterol can be recovered from the alcohol solvent and sold as a commercial product. The alcohol can be recovered and reused in the process.

Ordinarily 95 or 96% alcohol is satisfactory for the process of my invention. The content of alcohol is not critical and alcohol containing small amounts of other solvents or water can be used quite satisfactorily. In some cases, such diluted solvents are preferred, such as for instance in connection with the separation of Vitamin A ester from Vitamin A alcohol. Alcohol of approximately 83–85% strength, the balance of which is water, is preferred for this extraction since the alcohol form of the vitamin is substantially soluble in this solvent while the Vitamin A ester is substantially insoluble therein.

Example I

Second fraction distilling between 160°–210° C. from pollack-liver oil is passed counter-current through 95% ethyl alcohol, the distillate and the alcohol being in the proportion of two volumes to three, respectively. Much of the cholesterol, the free fatty acid, and the fish odor pass into the alcohol. Part of the Vitamin A also dissolves in the alcohol, but this can be recovered later. The oil raffinate is lighter in color, and the cholesterol and fatty acid content are substantially diminished. The degree of diminution depends upon the number of stages of extraction.

Example II

Vitamin A alcohol produced by saponification of a crude fish oil or of a molecular concentrate is allowed to react with acetyl chloride in pyridine. The product of the reaction is essentially Vitamin A acetate with some unchanged Vitamin A alcohol. The mixture is freed from pyridine and volatiles by distillation in a vacuum and is then passed counter-current through 85 per cent ethyl alcohol. The unesterified Vitamin A dissolves in the solvent, and the Vitamin A acetate remains in the raffinate.

Procedure for preparing Vitamin A in ester form either by high vacuum distillation or by synthetic means is well known in the art. The distillation procedure involves heating a fish oil under a high vacuum and condensing vapors upon a condensing surface separated from the heated oil by unobstructed space. For further details reference is made to Hickman Patent 1,925,559 and Hickman applications 39,148, filed September 4, 1935; 56,587 filed December 28, 1935; 112,847, filed November 27, 1936; and 174,491, filed November 13, 1937.

What I claim is:

1. The process of purifying a concentrate of a carboxylic acid ester of vitamin A which contains impurities of the kind selected from the group consisting of impurities normally present in a reaction mixture from an esterification of vitamin A alcohol and impurities normally present in a vitamin A concentrate derived from a fish oil which process comprises extracting the impurities from the concentrate by contacting it with an alcohol selected from the group consisting of methyl and ethyl alcohol and separating the alcohol containing the extracted impurities from the concentrate being purified, the impurities present being substantially soluble in methyl or ethyl alcohol.

2. The process of purifying a vitaminous substance which comprises treating a concentrate of a carboxylic acid ester of vitamin A, derived from a fish oil and containing impurities associated therewith, with an aliphatic alcohol of low molecular weight the impurities present in the concentrate being to a substantial extent soluble in an aliphatic alcohol of low molecular weight.

3. The process of purifying a synthetically prepared concentrate of a carboxylic acid ester of vitamin A containing impurities normally present in a reaction mixture in which vitamin A alcohol is esterified, which process comprises extracting the impurities from the concentrate by contacting it with ethyl alcohol and separating the alcohol containing the extracted impurities from the concentrate being treated the impurities present in the concentrate being to a substantial extent soluble in ethyl alcohol.

4. The process of purifying a concentrate of a carboxylic acid ester of vitamin A derived from a fish oil and containing impurities normally associated therewith which process comprises extracting the impurities from the concentrate by contacting it with approximately 85% ethyl alcohol and separating the alcohol containing the extracted impurities from the concentrate being treated the impurities present in the concentrate being soluble to a substantial extent in 85% ethyl alcohol.

5. The process of purifying a concentrate of vitamin A in ester form which has been produced by high vacuum distillation of a fish oil containing vitamin A ester, which process comprises extracting the impurities from the concentrate by contacting it with ethyl alcohol and separating the alcohol containing the extracted impurities from the concentrate being treated.

6. The process of purifying a concentrate of vitamin A in ester form, which concentrate has been produced by high vacuum distillation of a fish oil which contains vitamin A esters, which process comprises extracting the impurities from the concentrate by contacting it with about 96% ethyl alcohol and separating the alcohol containing the extracted impurities from the concentrate being treated.

7. The process of claim 6 wherein countercurrent contact between the concentrate and the alcohol takes place during the extraction.

8. The process of purifying a concentrate of a carboxylic acid ester of vitamin A which has been produced by esterifying vitamin A alcohol derived from a fish oil and containing impurities associated with said fish oil and those formed during the esterification reaction which process comprises extracting the unreacted vitamin A alcohol and other impurities from the concentrate by contacting it with approximately 85% ethyl alcohol and separating the alcohol containing the extracted impurities including the unreacted vitamin A alcohol the impurities present in the concentrate being substantially soluble in 85% ethyl alcohol.

9. The process of purifying a synthetic concentrate of a carboxylic acid ester of vitamin A which has been produced by esterification of vitamin A and which contains unreacted vitamin A alcohol and other impurities formed during the esterification reaction which process comprises passing the concentrate to be treated in counter-current contact with a stream of approximately 85% ethyl alcohol, separating the alcohol, recovering the vitamin A therefrom and returning it to the extraction process the impurities extracted such as vitamin A alcohol being substantially soluble in 85% ethyl alcohol.

KENNETH C. D. HICKMAN.